United States Patent
Franza et al.

(10) Patent No.: US 9,813,972 B2
(45) Date of Patent: *Nov. 7, 2017

(54) LOCAL DATA COMMUNICATION TRAFFIC MANAGEMENT

(71) Applicant: Myoonet, Inc., Seattle, WA (US)

(72) Inventors: B. Robert Franza, Seattle, WA (US); Joshua Reyneveld, Seattle, WA (US)

(73) Assignee: Myoonet, Inc., Seattle, WA (US)

( * ) Notice: Subject to any disclaimer, the term of this patent is extended or adjusted under 35 U.S.C. 154(b) by 11 days.

This patent is subject to a terminal disclaimer.

(21) Appl. No.: 14/929,669

(22) Filed: Nov. 2, 2015

(65) Prior Publication Data

US 2016/0057648 A1    Feb. 25, 2016

Related U.S. Application Data

(63) Continuation-in-part of application No. 14/202,257, filed on Mar. 10, 2014, now Pat. No. 9,179,356.

(60) Provisional application No. 61/775,644, filed on Mar. 10, 2013, provisional application No. 61/844,113, filed on Jul. 9, 2013.

(51) Int. Cl.
*H04W 72/04* (2009.01)
*H04W 40/20* (2009.01)
*H04W 40/02* (2009.01)

(52) U.S. Cl.
CPC ........... *H04W 40/20* (2013.01); *H04W 40/02* (2013.01); *H04W 72/0406* (2013.01)

(58) Field of Classification Search
CPC ..... H04W 40/02; H04W 40/20; H04W 28/08; H04W 28/0247; H04W 28/0242; H04W 28/02; H04W 88/085

USPC ......................................... 370/329, 230, 498
See application file for complete search history.

(56) References Cited

U.S. PATENT DOCUMENTS

| | | | | |
|---|---|---|---|---|
| 7,035,281 | B1* | 4/2006 | Spearman | H04L 12/4604 370/401 |
| 8,019,886 | B2* | 9/2011 | Harrang | H04L 45/00 709/203 |
| 9,179,356 | B1* | 11/2015 | Franza | H04W 28/08 |
| 2003/0206528 | A1* | 11/2003 | Lingafelt | H04L 45/02 370/238 |
| 2013/0268984 | A1* | 10/2013 | Salinger | H04L 47/806 725/109 |
| 2014/0092828 | A1* | 4/2014 | Sirotkin | H04W 52/0258 370/329 |
| 2014/0119178 | A1* | 5/2014 | Zhao | H04W 28/0268 370/230 |
| 2014/0321265 | A1* | 10/2014 | Pitchai, Sr. | G06F 11/2097 370/219 |
| 2016/0143068 | A1* | 5/2016 | Chaudhuri | H04W 76/021 370/329 |
| 2017/0195866 | A1* | 7/2017 | Kim | H04W 8/005 |

* cited by examiner

*Primary Examiner* — Afsar M Qureshi

(74) *Attorney, Agent, or Firm* — Lumen Patent Firm

(57) ABSTRACT

A method and system is provided by which packets received from or destined for devices served by a bidirectional signal transceiver such as a distributed antenna system (DAS) (or "headend") by means of a connected Long-Term Evolution (LTE) eNodeB are serviced and routed locally rather than being placed arbitrarily on a Wide Area Network (WAN). The physical path length of the connections between the signal transceiver, eNodeB and primary router, and primary router and Evolved Packet Core (EPC), and primary router and secondary router is fundamental to the invention.

14 Claims, 9 Drawing Sheets

LOCAL DATA COMMUNICATION TRAFFIC MANAGEMENT

CROSS-REFERENCE TO RELATED APPLICATIONS

This application is a continuation-in-part of U.S. patent application Ser. No. 14/202,257 filed Mar. 10, 2014, now U.S. Pat. No. 9,179,356, which is incorporated herein by reference.

U.S. patent application Ser. No. 14/202,257 filed Mar. 10, 2014, now U.S. Pat. No. 9,179,356, claims priority from U.S. Provisional Patent Application 61/775,644 filed Mar. 10, 2013, which is incorporated herein by reference.

U.S. patent application Ser. No. 14/202,257 filed Mar. 10, 2014, now U.S. Pat. No. 9,179,356, claims priority from U.S. Provisional Patent Application 61/844,113 filed Jul. 9, 2013, which is incorporated herein by reference.

FIELD OF THE INVENTION

This invention relates to methods, devices and systems for managing locally, digital or analog information encoded as signals (herein referred to as data communication) from wireless and/or wired devices (I/O devices) be they phones, computers, sensors, touch screens, appliances and any other embodiment, with the intent of provisioning bandwidth intensive services, reduced latency, mitigation of risk, and improvement over other non-optimal features of communicating over wide area public networks like the Internet.

BACKGROUND OF THE INVENTION

Network communications takes place when interconnected devices send and receive digital data packets of information. Each packet contains a header with information pertaining to the device initiating the communication, the target for the communication, the position of the packet relative to other packets, error checking information, and data to be delivered by the packet. Network routers inspect the information in packet headers and compare that information to routing tables to determine what action should be done with any packet that has been received. If, for instance, the error checking information indicates that a transmission error has taken place, the router will issue a request for the packet to be resent. If the address information indicates that the packet should be sent on to another server, then the router adds its own information to the header and transmits the packet to the indicated server.

Presently, however, network routers do not consider the physical location of any given packet's source or destination. Any pathway taken by a packet is determined solely by the network information provided in the packet header, acted upon by each router in the pathway. Two devices, sitting next to one another in the same facility, may thus communicate through router and server connections that cause packets to move thousands of physical kilometers to make information available that otherwise might travel meters. The difference in packet path length between these two configurations affects the latency—that is, the delay between the sending of the package and its receipt, and the volume of network packet traffic placed on the network.

The number of network devices is rapidly proliferating. As these devices acquire highly dedicated functions such as sensors and cameras, they may transmit substantial amounts of data continuously. If all this data is transmitted conventionally, the capacity of the Internet is compromised due to packets taking transmission pathways much longer than actually necessary. The extra path lengths traversed by these packets degrades the performance of the network as a whole, requiring a variety of undesirable interventions—limiting transmissions, charging more for such transmissions, adding expensive new hardware resources to handle the increased volume, or discriminating among transmissions to give some "favored" status.

Existing network infrastructure routes packets of information from sending devices, through various receivers and routers, to destinations, typically in the form of servers and software connected to the network. Often these servers are housed in server farms, or data centers, where many servers share common power, cooling, security, and maintenance resources. A given data center, in addition to server resources, will operate an array of software and storage services, some general to the data center and other services proprietary to the clients operating the servers.

In the existing network traffic architecture, data centers are simply nodes connected to the network. Network packets—such as a message or a request for service—traverse a series of routers, from origin to destination. The architecture of this system is designed so that it does not matter where the points of origination and destination are—the strength of the system is that it does not matter to the network. Any packet with a well-formed destination address can be inspected and routed to its destination. This strength, however, comes at the expense of the total distance a packet must move to be delivered within the network. Two devices proximate to one another may communicate through a line of routers that are physically hundreds of kilometers away from the proximate devices. For simple communications, the latency caused by the distance traveled is often not noticeable. However, for real time communications such as high definition video, or when there are many such communications competing for service, such latency is not only noticeable but may compromise the quality of service.

The coming revolution in networked devices enabled by such technologies as various radio frequencies (RF) traversing fiber optic cable (RF-over-fiber), in which many devices such as sensors producing significant data streams may be readily integrated into a network, have the prospect to overwhelm the current architecture. One response is to abandon neutrality in the service of packets, choosing some for priority while limiting the rest, based on various schemes, including payment, decisions regarding importance, and the like. Any such decision, however, runs against the foundation of the Internet as one in which packets move at the capacity of the routing and server resources, not as a result of market interventions. Another response is a massive investment to supply more resources and upgrade existing resources, so that packet routing neutrality can be maintained. Such an investment, however, is prohibitively expensive.

What is desired is a method and system by which packets destined for devices physically proximate to the transmitting device are serviced and routed locally rather than being placed arbitrarily on a Wide Area Network (WAN), or creating communication technology necessary to service these packets that are placed on a WAN. The present invention addresses this desire.

SUMMARY OF THE INVENTION

The present invention provides a method and system by which packets received from or destined for devices served by a bidirectional signal transceiver such as a distributed antenna system (DAS) by means of a connected Long-Term Evolution (LTE) eNodeB are serviced and routed locally rather than being placed arbitrarily on a Wide Area Network (WAN). The physical path length of the communicative connections between components is fundamental to the invention. Accordingly, proximate is defined by a transmission pathway of less than 30 meters with a transmission pathway delay, i.e. latency, which is preferably less than 150 milliseconds. Thus, in the invention the signal transceiver, eNodeB, primary router, Evolved Packet Core (EPC), and any additional signal transceivers, secondary routers, or data centers are all proximate. Devices communicatively connected to the invention by means other than a WAN are called local devices, which need not be proximate. By "off-WAN" is meant not physically or communicatively connected to a wide area network, or programmatically disconnected from a wide area network. An eNodeB or Evolved Node B is a radio resource controller and radio mobility manager supporting OSI Layer 1 and Layer 2 protocols. We use the term eNodeB broadly to include variations performing the same function but which support other communication protocols, including Node B, Node B with radio network controller, and base transceiver station.

The proximate communicative connection of eNodeB (ordinarily designed to send and receive packets on a WAN) and EPC (which is ordinarily designed to be distributed on a WAN) with a primary router that works to prevent packet entry onto a WAN, including by routing to a second proximate router that handles packets directed to compute and/or storage resources available off-WAN. In this invention the eNodeB and the EPC can be configured to operate only in an off-WAN configuration. By integrated resource data center (IRDC) compute services or computer resources is meant provision of computational services by means of software operating on one or more processing units, and providing functions in the form of (for illustrative purposes) virtual machines, database services, backup services, and network analytics. By storage is meant resources to place, maintain, and access content or data, and reference is made to one or more of storage, or stored content or data as the context requires.

The invention, an Integrated Resource, houses the proximate components of the system, essentially off-WAN, eliminating backhaul communications to process local services and redundant transport of data and compute services that can be provided locally, not by means of a WAN. A WAN connection permits the integrated resource to perform status updates of devices served by the integrated resource. In the text that follows, Integrated Resource Primary Router and primary router are used with the same meaning, as are Integrated Resource Secondary Router and secondary router, as are various other terms such as data center, when used in reference to the components of the inventive system.

The integrated resource also provides a means for non-cell devices to be registered devices on a cell provider's network, and communicate, by means of their native protocols, with other registered devices, including cell-capable devices, all within the local communications area served by the integrated resource, all without any traffic on a wide area network. In our usage, a registered device is one that is recognized and valid on a given network. At present, in conventional implementations, if a device enabled for voice over Internet places a call to a cell phone, a connection is made, but it requires the use of WAN resources. The integrated resource does not use WAN resources for communications served by communicatively connected devices, which are managed by the same primary router via its eNodeB and EPC, or managed by a secondary router, within the integrated resource. Instead, the primary router switches non-cell to cell (and vice versa) within the integrated resource, before any traffic moves onto a WAN. The second router with a registered device firewall and the primary router with integrated EPC handle these functions without use of a WAN.

A secondary router proximate to the primary router and to a data center with compute and storage resources within the integrated resource are configured, as well, to permit WAN-directed packets to be serviced within the integrated resource and off-WAN. This secondary router may be a separate physical device or it may be an extension of the primary router's logic.

A function of the invention is to repurpose components, previously designed for WAN applications and presently distributed across a WAN, into an integrated resource of proximate components that selectively prevent WAN traffic, while still providing requested services, which may conventionally have been provisioned by means of WAN connections.

In summary, we highlight the following elements:
The proximate combination of a bi-directional transceiver (such as a DAS headend), an off-WAN eNodeB, a primary router, and an off-WAN Evolved Packet Core, where a WAN connection, if any, is via the primary router.
The proximate pairing of a primary router with a secondary router to permit a switching function to filter local destination communications for integrated resource services. The secondary router may be a physical device separate from the primary router, or an expanded logic of the primary router.
Local destination is determined by the integrated resource, not by the addresses in the communications stream.
The physical separation of the primary router and its communicatively connected components from the secondary router and its communicatively connected components, permitting multiple vendors to have their own primary router and connected hardware in the same installation while sharing common secondary router and hardware.
The primary router and the secondary router practice methods of filtering communications for local, off-WAN services.
The function of a primary router and secondary router can be combined into a single physical device in some embodiments of the invention.
Proximate, off-WAN switching of communications between two communication protocols by the proximate collocation of a second bi-directional transceiver and router so that local communications to and from the second bi-directional transceiver are routed by a second proximate primary router selectively to a first proximate primary router, all off-WAN, and the method of practicing this cross-protocol switching to filter local destination communications for local services.
Proximate, off-WAN switching of communications between two communications services by the proximate collocation of a second eNodeB and second proximate primary router, so that so that local communications to and from the second eNodeB are routed by the second proximate primary router selectively to the first proximate primary router, all off-WAN, either by a direct communicative connection between the first and second primary routers, or by routing communications through a common, proximate secondary router, and the method of practicing this cross-services switching to filter local destination communications for local services. In this configuration, status updates between the two services also take place off-WAN.

An Integrated Resource could be contained within (transported by) satellite, space station, balloon, manned or unmanned aircraft, robot, terrestrial vehicle (of any type) on planet earth or any other celestial body, or/and animal (including humans) either as a worn, carried or embedded instantiation.

BRIEF DESCRIPTION OF THE DRAWINGS

Definitions and Abbreviations:
CL Routing logic that determines whether a device requesting communications services is registered for access to the primary router IRPR.
Communications An inter-device transfer of data carrying signals, irrespective of the frequency of the signal used for communication. Depending on the standards of any specific communication protocol (e.g., WiFi (802.11), WiMax (802.16), Gigabit Ethernet, cable communication standards, and any future data transmission standard) the datagram (bit structure) of that specific communication protocol may properly be referred to as a "packet," or a "frame."
CT Cell Table, a routing logic maintaining information on registered devices allowed access to the IRPR.
DAS Distributed Antenna System (DAS) is a frequency-based communications transportation system and signal transceiver for conveying communications created with technology, such as, but not limited to, LTE, CDMA, EVDO, GSM, HSPA, UMTS, which is embedded within the frequency and encoded/decoded by a communicatively connected device.
 The DAS equipment does not have any cell phone/smart phone-like capabilities. Moreover, it does not have any carrier or Internet service provider packet detection, packet deciphering, packet routing, as well as any ability to service any of the requests or actions that the contents of the packets are intended to elicit.
 DAS supports individually, or any combination of voice video, data services, over 150 MHz (paging), 450 MHz (paging), 450 MHz (radio), 700 MHz (public safety radio), 800 MHz (public safety radio), LTE (700 MHz), CELL (800 MHz), PCS (1900 MHz), AWS (2100 MHZ), 802.11 (2.4 GHz, 5 GHz, 60 GHz), Gigabit Ethernet (list is not exhaustive).
EN Ethernet-based communications system.
eNodeB eNodeB is a radio resource controller and radio mobility manager supporting OSI Layer 1 and Layer 2 protocols; moreover an eNodeB supports a set of legacy features, all related to physical layer procedures for transmission and reception over the radio interface including modulation and de-modulation, channel coding and decoding. We use the term eNodeB broadly to include variations performing the same function, but which support other communication protocols, including Node B, Node B with radio network controller, and base transceiver station.
EPC Evolved Packet Core is composed of a mobile management entity, a home subscriber server, a serving gateway, a packet data network and a policy and charging rules function server.
Ethernet Ethernet frames and packets as formally defined in the Ethernet specification IEEE 802.3.
IR Integrated Resource, a proximate, off-WAN, communicatively connected collocation of components comprising, at a minimum, a DAS, eNodeB, IRPR, and EPC. An IR may include other components, also proximate, off-WAN, and communicatively connected, including secondary routers and an integrated data center.
IRCT Integrated Resource Connection Table, a custom routing logic to manage WAN-destined communications.
IRDC Integrated Resource Data Center, comprising proximate compute and storage resources.
IRNT Integrated Resource Network Table, routing logic maintaining the addresses for compute and storage systems available in an IRDC.
IRNTx An extension of a secondary router IRSR routing logic that includes the secondary routing logic IRNT of one or more connected secondary routers IRSRx.
IRPR Integrated Resource Primary Router.
IRPRCT An extension of primary router IRPR routing logic that includes the routing logic LDT of one or more communicatively connected primary routers IRPRx.
IRPRx Integrated Resource Primary Routers at one or more Integrated Resource installations, each communicatively connected, off-WAN, to one or more of the others.
IRRDT Integrated Resource Registered Device Table, a routing logic maintaining information on registered devices allowed access to a primary router IRPR, to IRSRx, to WANx via IRSR, or to a proximate data center IRDC.
IRSR Integrated Resource Secondary Router.
IRSRx Integrated Resource Secondary Routers at one or more Integrated Resource installations, each communicatively connected, off-WAN, to one or more of the others.
LDT A routing logic for packets destined for secondary router IRSR management. Multiple routers may maintain LDTs and the LDTs may not be identical.
WANx 0, 1, or multiple Wide Area Networks.
WFR WiFi Router.
WiFi IEEE WiFi (802.11x) datagram as defined for WiFi, i.e., frames that are used for transmission of data, as well as, management and control of wireless links.
WiMax IEEE 802.16.
X Any arbitrary radio frequency based communications protocol.
XM Packet management controller for communication protocol X.
Y Any arbitrary radio frequency based communications protocol antenna system.
YC A bi-directional transceiver that converts protocol Y communications into the communication protocol of the integrated resource, and converts the communication protocol of the integrated resource into protocol Y communications.
Z Any arbitrary radio frequency based communications protocol antenna system.
ZC A bi-directional transceiver that converts protocol Z communications into the communication protocol of the integrated resource IR, and converts the communication protocol of the integrated resource IR into protocol Z communications.

In other words, an access point router serving one or more user devices that are not able to send or receive cell signals provides an interconnection for Ethernet packets (or other non-cell communications) with a primary router (IRPR). The IRPR then may process such packets as if generated by a device capable of cell communications. In essence, non-cell capable devices may subscribe for access to a cell service. The WFR also routes non-cell-destined local traffic for services to the IRSR, including typical local area network-style server functions, network attached storage, and routing onto WAN for non-local destinations and services.

Figure 1:
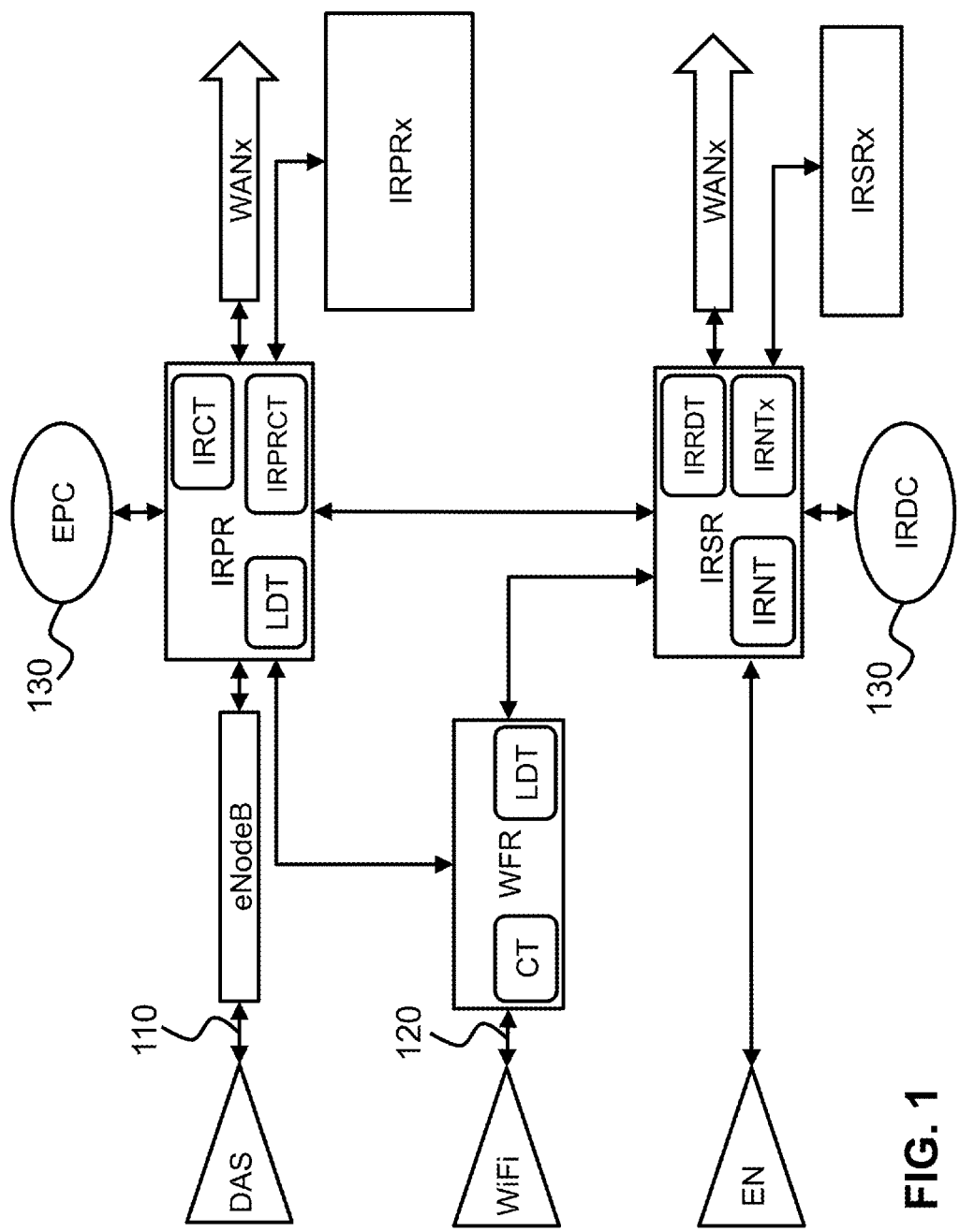
FIG. 1 shows a system architecture according to an exemplary embodiment of the invention. Arrows represent communication interconnections. Specifically, 110 is a non-Ethernet communication connection, 120 represents Ethernet frames, and all other arrows represents Ethernet connections. Rounded items 130 represent router logic, commonly employing tables, circuits, algorithms, or firmware.
Figure 2:
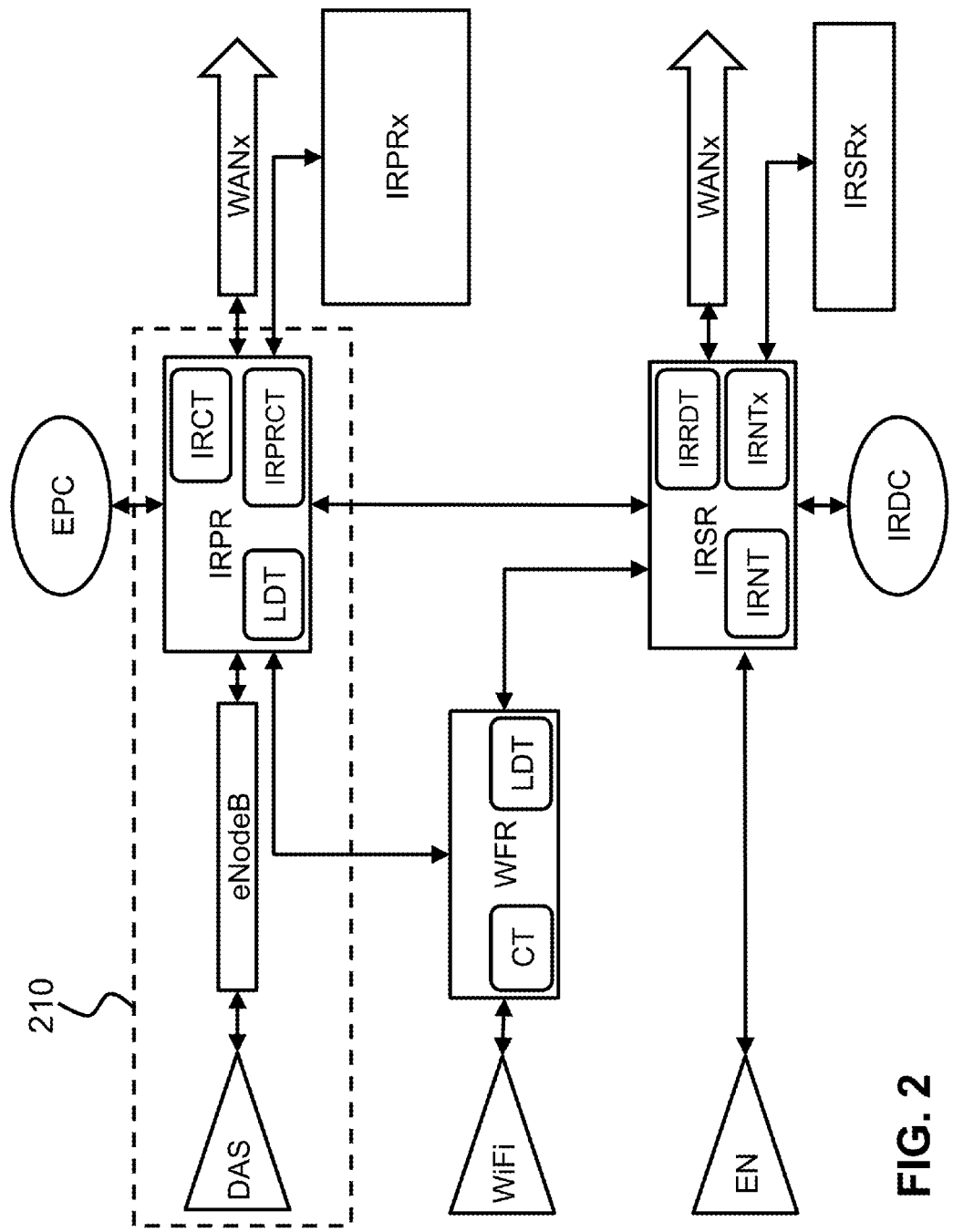
FIG. 2 shows an example of the physical collocation 210 of a DAS and eNobeB with a primary router according to an exemplary embodiment of the invention. The primary router at the output of an eNodeB functions to prevent certain packets from going to the WAN. A DAS is connected to a carrier-supplied signal by means of its headend, which typically has a bidirectional amplifier (BDA) and is often referred to as a base transceiver station (BTS). The present invention eliminates the BDA/BTS and connects the headend directly to the eNodeB, and then consolidates the entire carrier information technology infrastructure to manage communications on its RF signal by connecting the eNodeB directly to the primary router (IRPR) and an EPC operating off the WAN.
Figure 3:
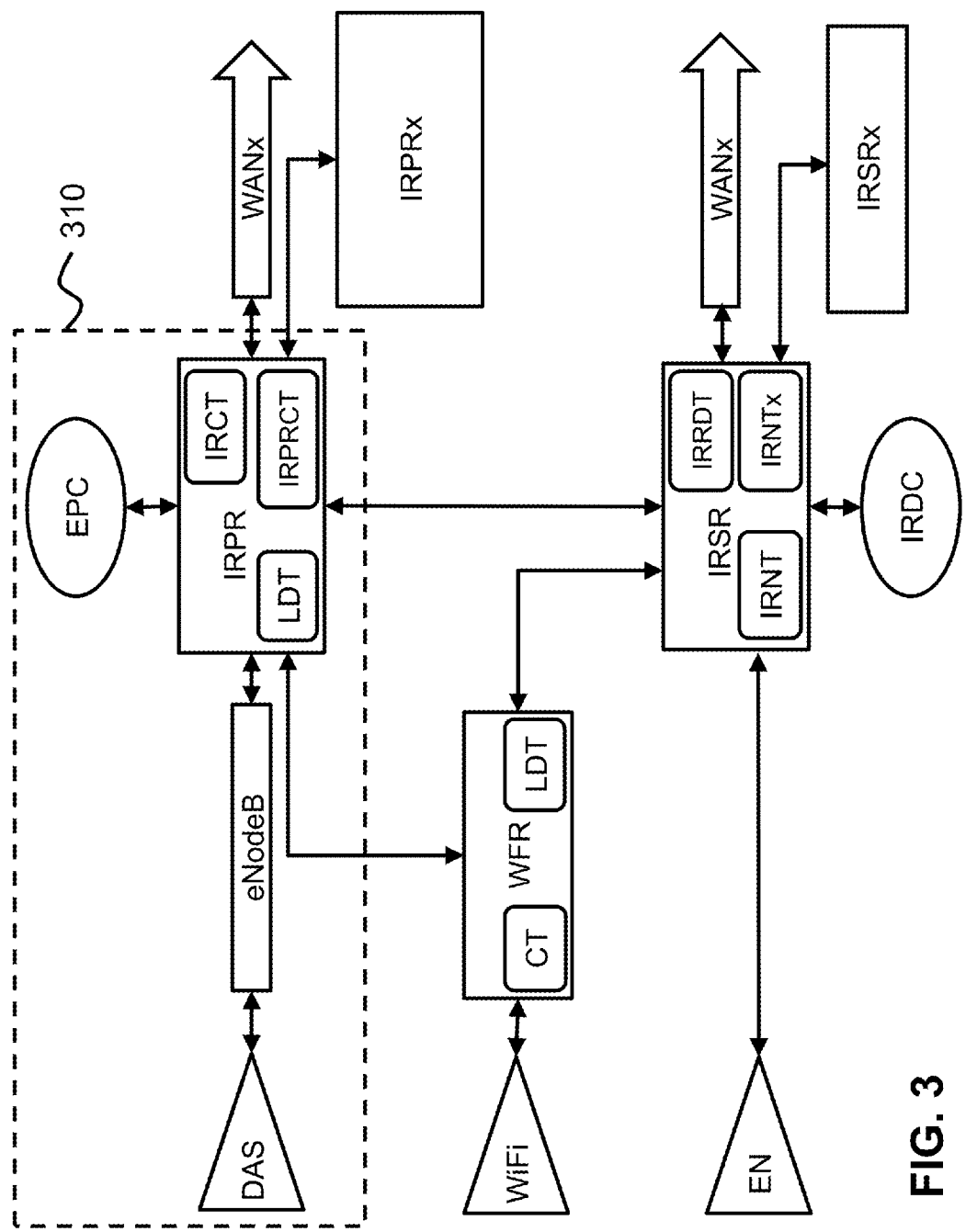
FIG. 3 shows an example of the physical collocation 310 of 210 with an off-WAN EPC according to an exemplary embodiment of the invention to serve local originating packets from a dedicated eNodeB, with a primary router as intermediary.
Figure 4:
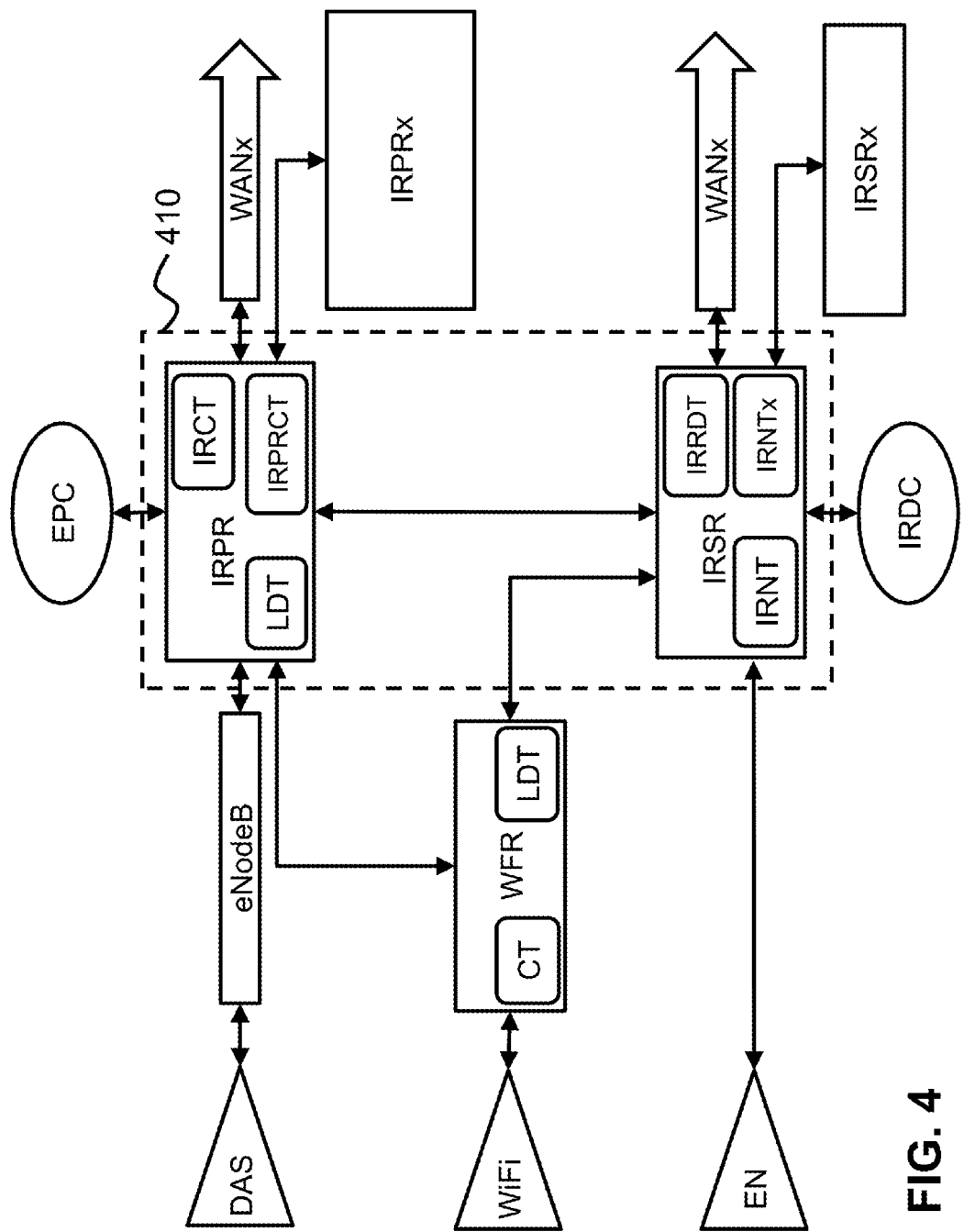
FIG. 4 shows an example of the physical collocation 410 of two routers according to an exemplary embodiment of the invention to re-route traffic to local devices, and re-route traffic requesting WAN-available services to local services duplicating WAN-available services are available in an Integrated Resource Data Center, while at the same time passing through WAN-destined traffic for which local services or local devices are not present. The routers also route traffic requesting distinctively local services to the Integrated Resource Data Center. With this configuration there will be functionally distinct router services, one to route cell or other specialty RF-based services and a second function to route local compute and storage services requested by local devices. In other words, we have an interconnection of two routers, off-WAN, to provide services that duplicate WAN services as well as distinctive local services. The system allows selected services and content that would otherwise have been delivered over a WAN to be delivered as if to requesting devices service requests had be processed over a WAN. In particular, the Integrated Resource Primary Router and Secondary Router routing logic allows for duplication of WAN addresses. Rather than redundant transport of content or compute services on demand over a WAN, the invention enables redundant WAN addresses at which content and compute services that duplicate WAN content and compute services.
Figure 5:
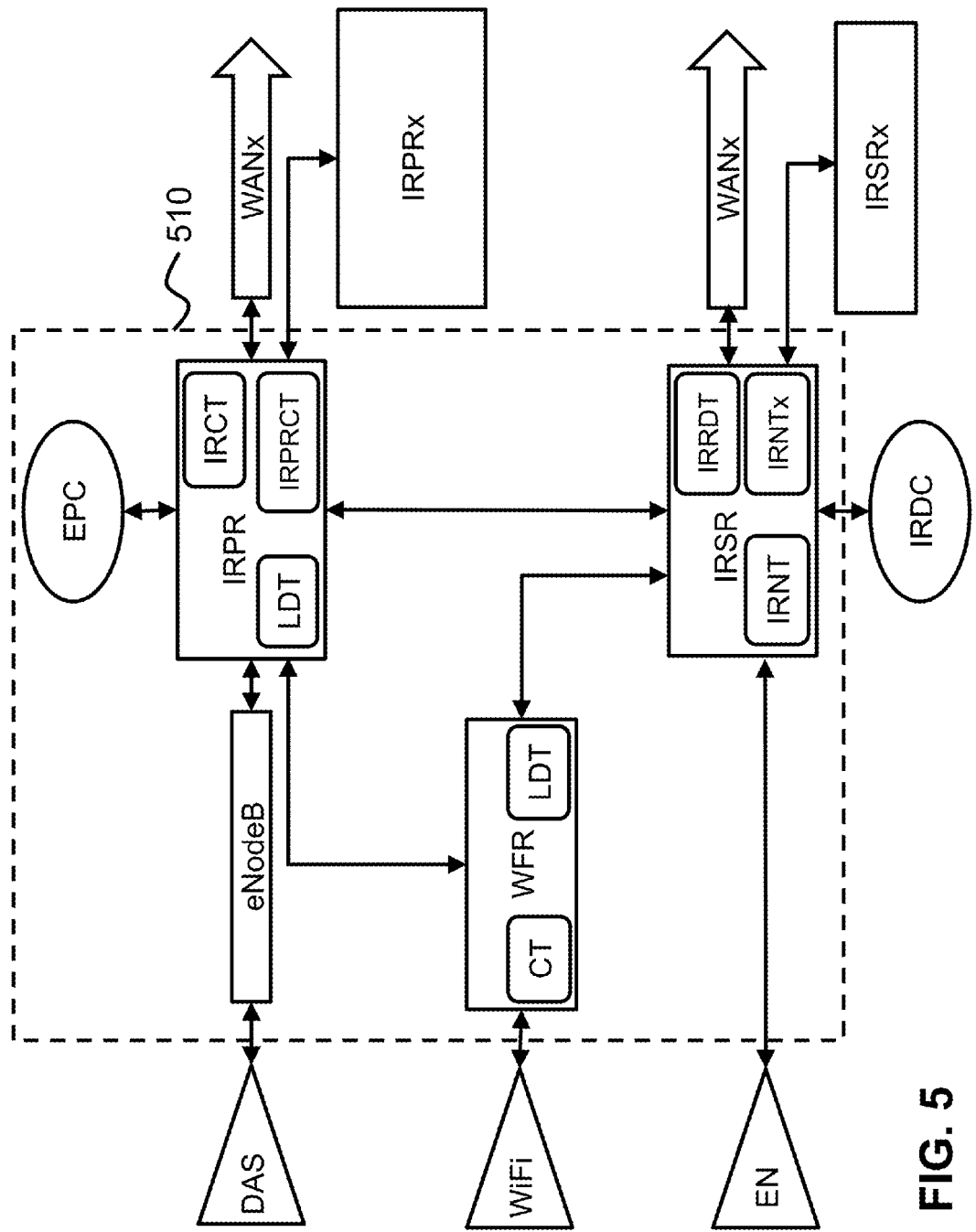
FIG. 5 shows an example of the physical collocation 510 of IRPR, EPC, eNobeB, and IRSR according to an exemplary embodiment of the invention. IRPR, EPC, eNodeB, IRSR are shown with one or more collocated WiFi routers (WFR), each WFR supplied with tables that permit local routing to IRSR or to IRPR for crossover to a cell network. In place of or in addition to one or more WiFi routers, any access point sending and receiving any specified protocol over RF, and converting that protocol into Ethernet or another installed protocol in the IR may be collocated in the IR, providing connections between local registered devices that do not communicate in a carrier's native protocol with devices served locally and non-locally by the carrier's native protocol.
Figure 6:
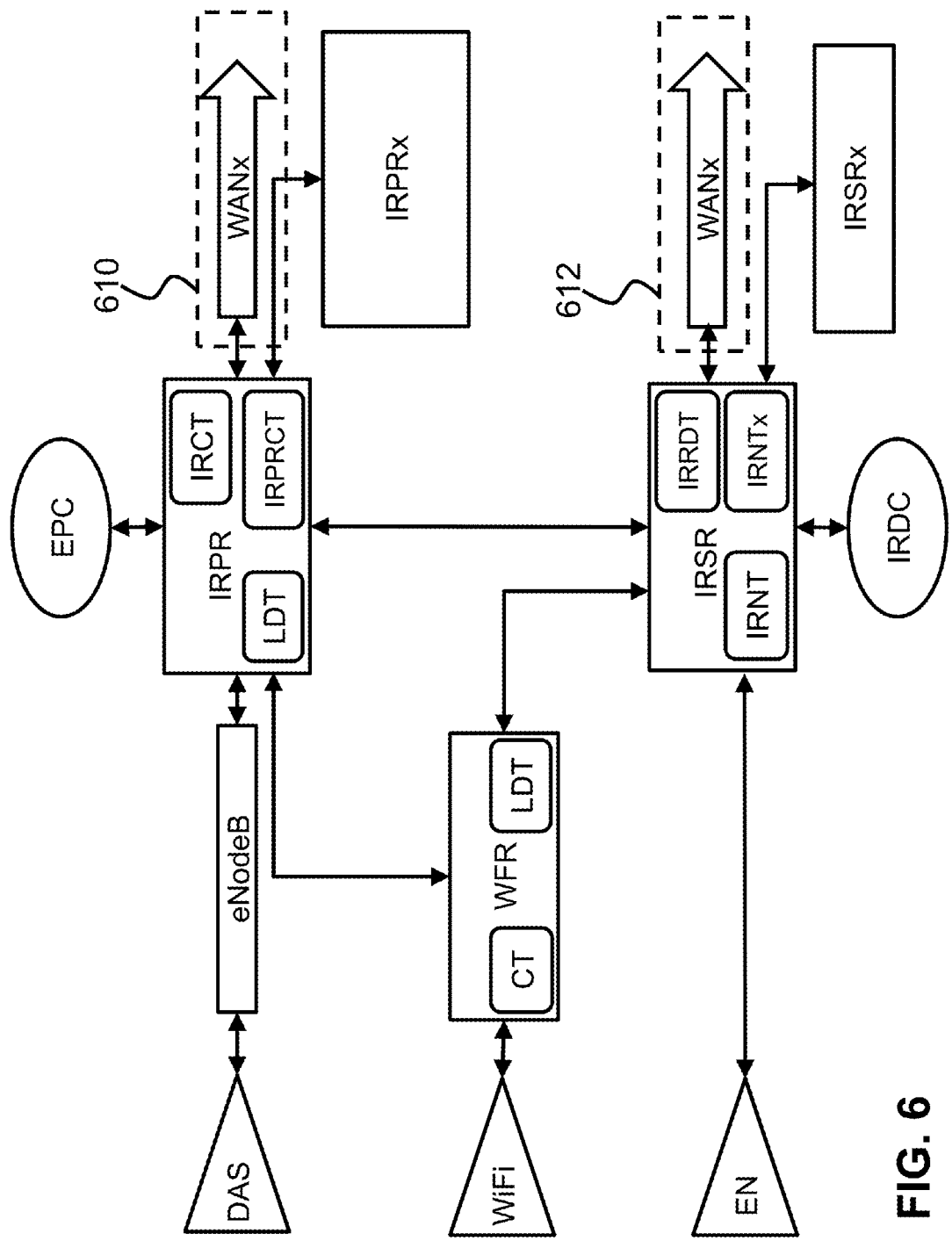

FIG. 6 illustrates according to an exemplary embodiment of the invention that cell communications generated by local devices destined for local devices within an IR have no backhaul or other presence on any WAN (other than an optional status update of their service status and location). Similarly, content (or data) service requests made by local devices do not result in redundant transport of content (or data) over a WAN when the content (or data) is available locally (within the IRDC or served by my means of a network of IRPRx). There is no backhaul WAN activity to service local routed traffic. There is no redundant transport of data/content available from local compute/storage services, including such services at duplicated WAN addresses. WAN 610, 612 are used to send device status updates to WAN-based EPCs, to update router logic with status information as failover when direct connections are not available, and to send and manage content/data installed in communicatively connected, off-WAN Integrated Resource Data Centers. For example, a video file sent once to a thousand Integrated Resources may permit millions of local streamed viewings of that video file without further use of WAN resources other than to update WAN-based subscriber status information.

Figure 7:
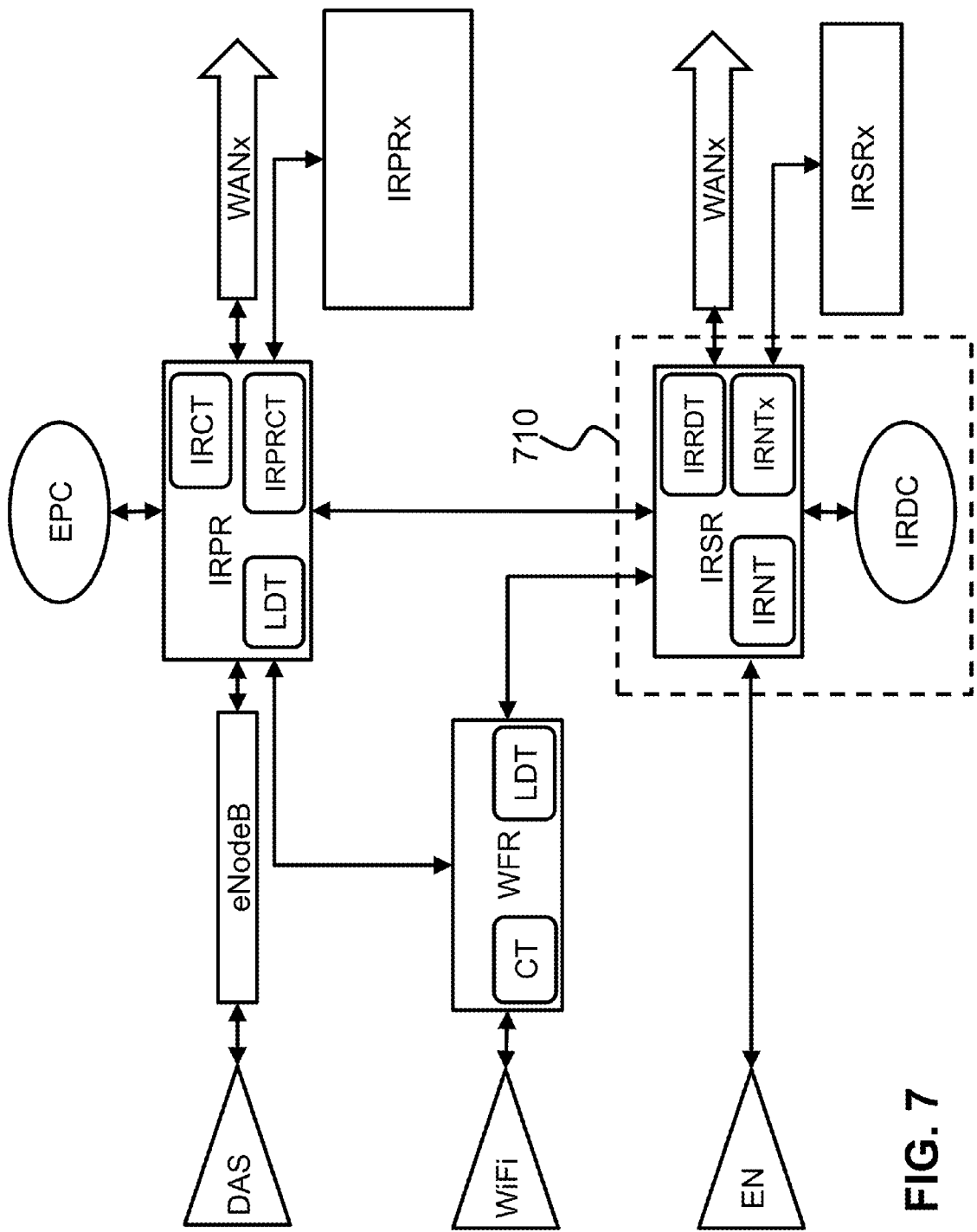

FIG. 7 illustrates according to an exemplary embodiment of the invention a system configuration 710 in which addresses in the Integrated Resource Primary Router and Integrated Resource Secondary Router may be unique or may duplicate addresses on a WAN. A device communicatively connected to the Integrated Resource, the device's communications, and WAN resources that would otherwise service those communications experience no changes. The Integrated Resource Secondary Router's routing logic IRNT includes the possibility of: 1) destinations unique to the IRDC, 2) destinations unique to the secondary routing logic IRNT of a connected secondary router IRSRx but unknown by any WAN, 3) destinations that are duplicates of WAN addresses at the IRDC. For item 3, the Integrated Resource creates an environment in which selected WAN addresses may also exist within one or more Integrated Resource routers as duplicates, but with no possibility of also appearing as duplicates on the WAN. This way, the Integrated Resource router function allows the recreation of selected portions of any WAN resources in a local, off-WAN environment. WAN communications may also be used to transport content (data) for storage to an Integrated Resource Data Center of content (data) for storage and local access. WAN communications may be used to communicate status information.

Figure 8:
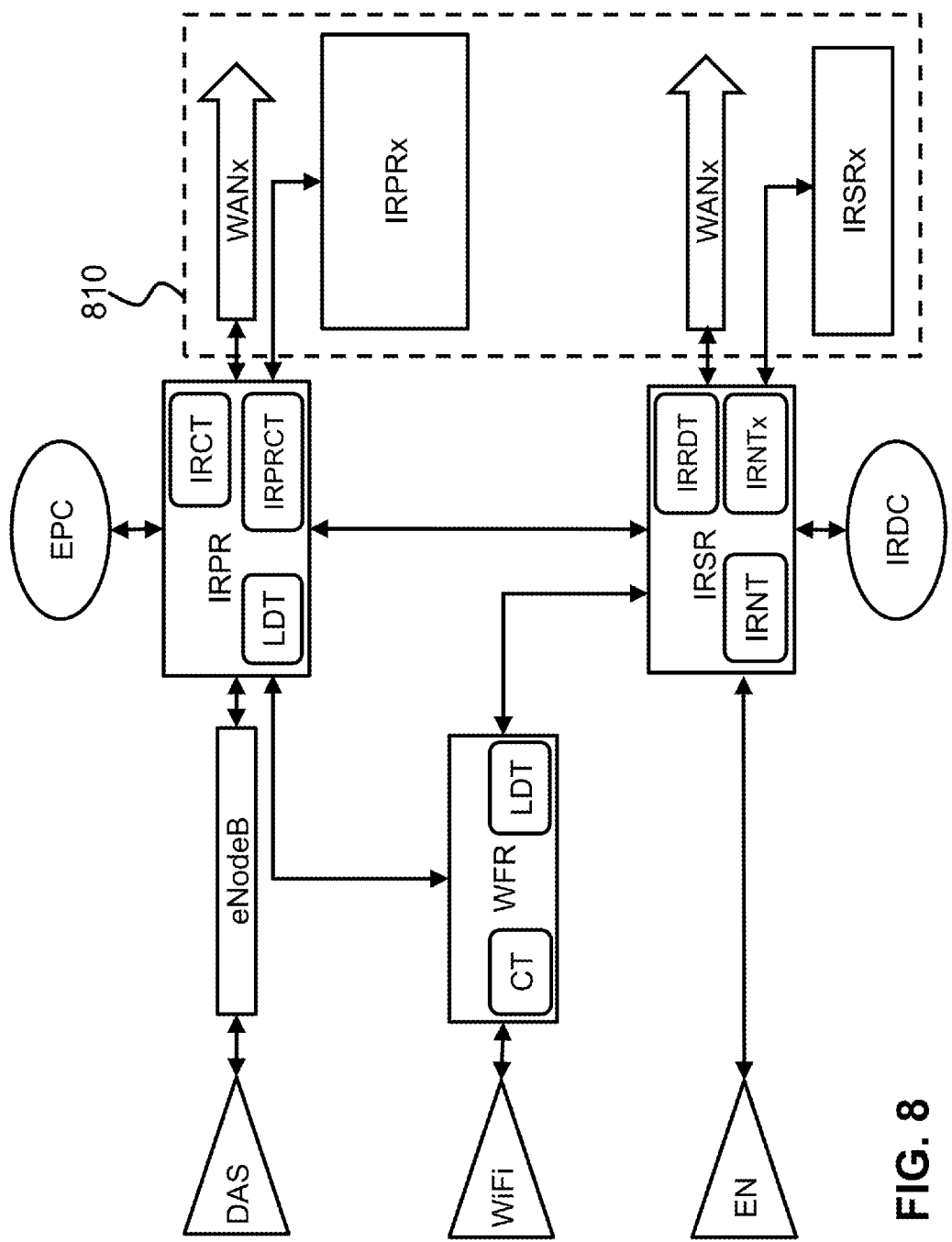

FIG. 8 shows according to an exemplary embodiment of the invention a system configuration 810 of the interconnection between the primary router (IRPR) and other primary routers (IRPRs), such that the IRPR can pass traffic to other primary routers without use of WAN resources, when those IRPRx have the required routing logic or devices registered for local services. Both IRPRs and IRSRs are scaleable to route directly to other connected IRPRx and IRSRx, via direct connection (wired, wireless, or any RF protocol) or as a failover via WAN connections (any protocol). To a local device all IRPRx look just like the IRPR that directly serves the outputs of that device's eNodeB or other proximate signal transceiver, and all IRSRx look like the IR that serves the local IRPR.

Figure 9:
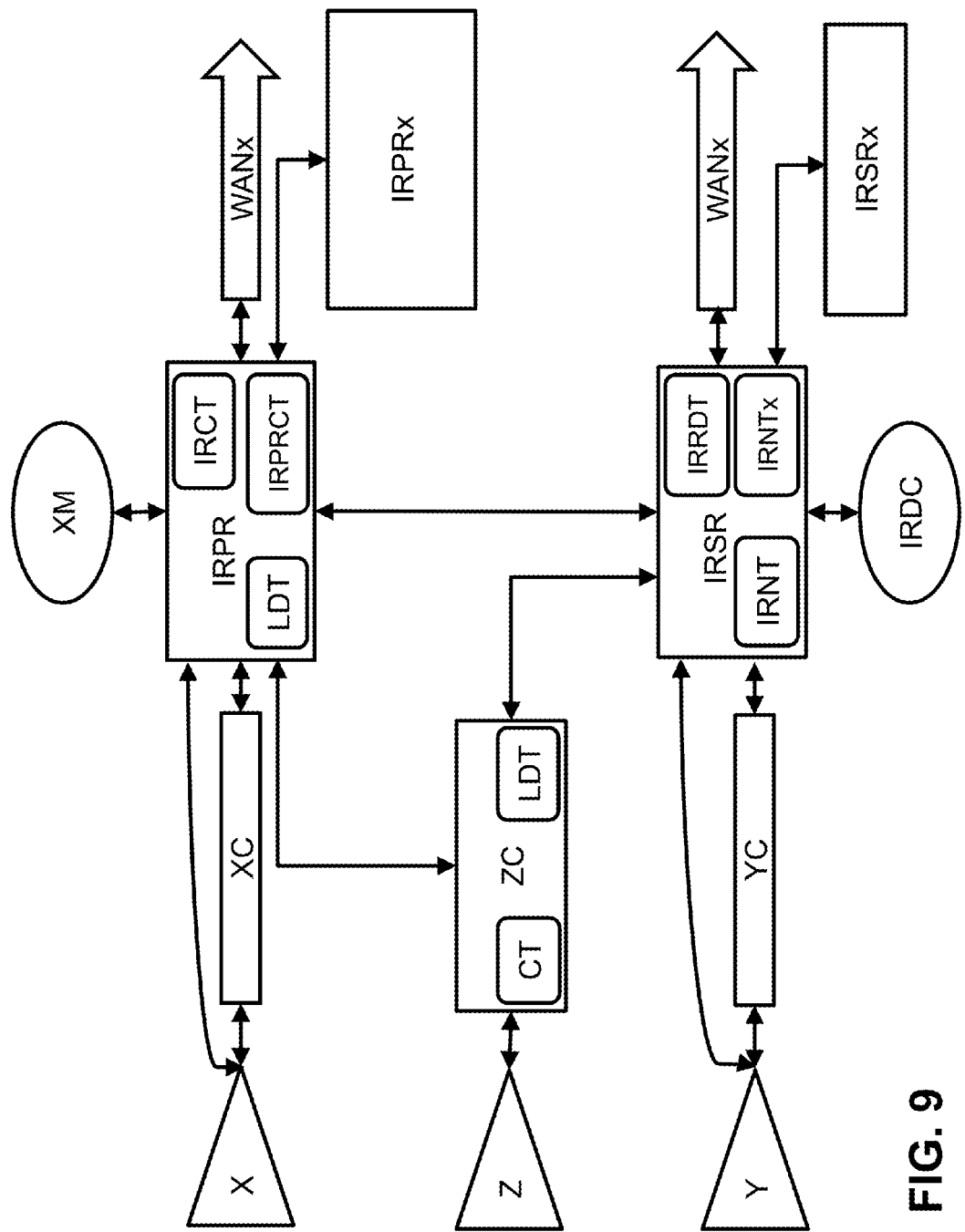

FIG. 9 shows a generalized system configuration according to an exemplary embodiment of the invention. Arrows in this figure represent one or more communications protocols. X, Y, and Z may be the same or different communications protocols. A signal may be managed directly by the Integrated Resource Primary Router, may be first converted to an installed protocol at the Primary Router prior to being received by the Primary Router, and a signal from a device that cannot produce the base signal X or have direct access to any given DAS by means of its headend, may move through an access point ZC, which may convert the signal into any appropriate protocol installed on the IRPR and IRSR. One or more distributed antenna systems is represented by X in a triangle. One or more devices communicating with a common access point ZC is represented by Z in a triangle. One or more devices communicating with an IRSR on a common protocol is represented by Y in a triangle. XC represents one or more converters of protocol X into any other installed communication protocol available to IRPR. ZC represents one or more converters of protocol Z into any other installed communication protocol available to IRPR. One or more converters of protocol Y into any other installed communication protocol available to IRSR is represented by YC.

In the Primary Router, local destinations are handled by local destination logic, LDL. That logic may be any method by which the IRPR determines a received signal requires local routing or local compute/storage services. Available devices and compute/storage services on other primary routers (IRPRx) are determined by Primary Router logic (IRPRLx). Custom routing instructions for accessing external wide area networks, or any external resources, whether networked or otherwise, is controlled by wide area logic, WL. One or more Integrated Resource Primary Routers connected with the Integrated Resource Primary Router is represented by IRPRx. An Integrated Resource may have one or more proximate Primary Routers (IRPRx). Additional Primary Routers, however, may or may not be proximate.

Control and management hardware and software to manage the status of user devices, including by way of illustration, location, subscription, usage, available protocols, routing preferences, error handling, and security, is represented by an ellipse and XM.

In the IR Secondary Router (IRSR), local destinations are handled by local destination logic (mL). That logic may be any method. Detection and management of registered devices is handled by registered device logic (rL). Any logic method may be used. Registered devices and compute/storage services connected to other Integrated Resources, by means of the routing logic of Second Routers (IRSRx), are controlled by Integrated Resource Second Router extended logic (mLx). One or more IR Second Routers connected with the IR Second Router is represented by IRSRx. One or more clusters of proximate compute/storage resources served by an IRSR is represented by mN. An Integrated Resource may have one or more Second Routers (IRSR). Connections to external wide area networks, or networks or external devices of any sort capable of communicating in any protocol installed on a IRPR or IRSR is represented by block arrows and WANx.

DETAILED DESCRIPTION

The present invention provides a network traffic control, services provisioning, and content access system architecture that is compatible with existing infrastructure, but shifts a substantial volume of current and anticipated network traffic to more efficient routing, services, and storage resources.

A means to accomplish such routing is provided by embedding a router architecture within a hardware and software environment that provides the functions of a data center, with proximate access to compute, server, and storage capabilities. Such a domain of physically proximate communicating devices may be called a Facility, and the proximate components so combined can be referred to as an Integrated Resource. A Facility may be a building or cluster of adjacent buildings, a portion of a building, a residential neighborhood, or other such configurations in which multiple devices are capable of sending and receiving network communications and also share communication resources provided by a single Integrated Resource.

In such situations, communications among such devices are best serviced by short transmission path lengths, on the order of a few meters to tens of meters under local Integrated Resource control rather than potentially much longer transmission path lengths, on the order of hundreds of kilometers or greater, required by arbitrary Internet and other wide-area network (WAN) communications.

Short Path Length Routing

An Integrated Resource preferably operates with communication path lengths of 30 meters between receipt of a communications packet and the provisioning of services and routing for that packet. With wavelength routing within an optical package switch and transport, however, path lengths within a ring of Integrated Resources of 500 kilometers (circumference) are now achievable. Short transmission path lengths, in addition to reducing latency, and thereby improving performance and reducing the load on common wide area network communications resources, also provide privacy and security for transmissions, which when routed locally are not exposed to vulnerabilities such as ones that may require resending of information or exposing information to breaches of privacy in the lines and servers between transmitting and receiving devices.

Methods of routing of communications traffic within a local area network have been established. Common to such methods is the use of one or more servers, each a device that maintains a table of all locally connected devices and their local addresses, and which provides a means for sending and receiving communications among these devices. However, such methods do not take into account either the path length of communications or whether a given packet should be routed locally or through an available wide area network such as the Internet to reach its target device.

The invention set forth herein addresses these issues by establishing a method and system whereby a collection of communicating devices may be organized as a Facility to be served by an Integrated Resource, the Integrated Resource maintaining one or more routers with the capability to determine whether a given transmission originates locally, and if so, whether the target for the communication is within the same Facility, and therefore may be serviced locally. Such service may include one or more of (1) the provision of services pertaining to the administration of communications by a carrier signal provider or by a user; (2) routing the communication to a local device; (3) using the capabilities of an Integrated Resource Data Center to store information for retrieval by a local device; and (4) the local provision of services requested by a user, which may include compute services, and content (data) storage, maintenance, and retrieval.

The Integrated Resource as an Edge Network Device

An Integrated Resource can be defined as including a signal receiving unit, such as a Distributed Antenna System (DAS) headend unit with one or more interfaces to fiber optic cable carrying one or more specific communication frequencies, combined with the functions of one or more Integrated Resource primary routers, one or more Evolved Packet Cores, extended by means of a secondary router and a proximate data center, all of which can operate independently of any connection with the Internet or other wide area network. As used here, a data center is a compute and storage resource comprising a collection of one or more central processing units, memory, and data storage, together with common power management, electrical supply, networking systems, environmental controls, and security in a common enclosure.

The Integrated Resource provides a set of routing, serving, and storage services to devices that share common communications infrastructure to interact with one another and obtain locally provided software, content, search, and analytical services. The Integrated Resource serves as an edge network device for a WAN, which would otherwise provide direct services to these local devices. As an edge network device, the Integrated Resource serves to selectively prevent local traffic from using the WAN when doing so permits may be accomplished by local communications and local services.

Embodiments of this invention shift decisions with regard to initial routing of packets to the front of the interface with the Internet or other wide area network rather than by making those decisions rely on communication being dependent on wide-area network communications.

Embodiments of this invention teach a new concept in the distribution of network routing and computing resources, where a data center is proximate to a primary router that may act as a WAN edge router, and where multiple such routers could be physically collocated in a system to manage local network traffic and provide services to local users.

Case Example: LTE

In a current LTE cellular communications design architecture, packet administration is achieved by an eNodeB communicating via specific protocols with the Evolved Packet Core (EPC) layer of the cellular network, or to other eNodeB resources, with communications typically traversing substantial distances to remote data centers to provide the requisite services to each communicating device.

In an RF-over-fiber (or any wavelength over fiber, e.g., 802.11, WiMax, 2.4 GHz, 5 GHz) optical environment, effectively the function served by the LTE eNodeB is performed by the various antennae linked via fiber to the headend unit. The signals traversing the optical fiber still travel some distance to the equivalent of an eNodeB base station and then onto the Evolved Packet Core (EPC) routing systems for connection with various data centers located within carrier facilities or distributed on the Internet or other networks.

In an embodiment of this invention, we combine in a Integrated Resource functions inherent to an LTE eNodeB and EPC with the headend unit of an optical (or otherwise) distributed antenna system (DAS). These components are managed by a Primary Router that also may communicate with one or more Secondary Routers to a proximate data center.

Positioning of a Resource in a Network

An Integrated Resource incorporates one or more routers with a data center located within the geographic area servicing local devices relying on a single RF carrier. In LTE implementations, an eNodeB interacts directly with such devices.

In an RF over Fiber network, this position is the DAS headend unit interface with one or more frequency providers (e.g., telecommunications carrier, Internet service provider) bi-directional amplifier and either terrestrial or microwave backhaul connectivity to carrier routing and data center functionality.

Local Routing Logic for Devices and Services

To accomplish the objective of keeping local communications local to a Facility, regardless of the number of private enterprises sharing the carriers available at that Facility, the Integrated Resource maintains, in addition to a wide area network routing logic (such as in the form of a table) consistent with conventional routers, a routing logic or table of proximate services that identifies available storage, software, and content available to devices within the Facility served by an Integrated Resource.

A user device, when it emits a signal that can be detected by a carrier within a Facility, registers itself with an RF carrier serviced by the Integrated Resource. The Integrated Resource, as a new system in network architecture, acts to process, route, and deliver services for local network traffic. Rather than route communications over arbitrarily long distances to server farms that are often vast and sophisticated, threatening to overload the communications channels, the present invention relocates critical pieces of network architecture and services to the Integrated Resource. From the perspective of local devices, the Integrated Resource is interposed ahead of any wide area network, and the Integrated Resource augments quality of service by diminishing latency of communications and increasing communications security and the range of services available to a user within a Facility.

That carrier may be proprietary, such as one owned by a cable company or cellular services company, or it may be common, created by the Integrated Resource's inherent technology to serve one or more RF carriers that are common to the Facility and not proprietary to any external company or network.

When a user device registers with a carrier, its MAC address, location information (i.e., geophysical location), and other information (such as user identity) are copied to the Integrated Resource router's local destination table and made available (according to the access information contained in the user identity management service) to the Integrated Resource for use in routing packets for service.

If the registered device then sends a communication that requires a service (such as routing or access to storage, software, or content), the Integrated Resource first uses local destination routing logic to determine whether that service is available locally by means of the Integrated Resource, available at a connected Integrated Resource, or whether the router must use the wide area network routing logic to route the packet onto the Internet or other public network for service. All service requests that can be processed locally within the Integrated Resource are so processed, unless the user overrides the Integrated Resource's authorization by means of settings available to the user.

Proximate Data Center Services

Establishing an Integrated Resource in this configuration enables its data center component to provide low latency access to both computational and content services. Computational services and content that may otherwise reside in data centers geographically dispersed from the one or more users can now be aggregated within an Integrated Resource.

Such aggregation renders subsequent demand for access to computational services and content independent of a WAN.

Collocation of RF Carriers

With the establishment of an Integrated Resource, multiple proprietors of RF spectrum can be collocated in an Integrated Resource, each maintaining its own primary routers, RF channels, eNodeBs, EPCs and other instantiations of cellular communications services. Each proprietor can also operate using its own virtual machine or other data center functionality independent of the other cellular providers, managing any transactions between their respective networks according to agreed-upon conventions. A primary advantage of such transactions within an Integrated Resource, however, lies in the ultra short data paths, which may be on the order of centimeters to a few meters, and resultant minimized latencies, between adjacent carrier systems collocated within the Integrated Resource.

Networking Two or More Integrated Resources

By interconnecting multiple Integrated Resources, packets may be routed through private networks, between Facilities for instance, to access services that minimize total latency for execution of those services, for the devices that will access them, compared with access to comparable services available through conventional wide area networks such as the Internet.

Implementations and Variations

An embodiment envisions an all-optical routing infrastructure in which the electric-to-optical transformation happens (1) as each signal is either detected or emitted by an antenna in the DAS configuration within a Facility (or from an outdoor antenna) and (2) at the interface between the all-optical routing infrastructure data such as data center servers and storage area networks. In such an embodiment the wavelength signature of each packet efficiently enables determination of "locality" and routing between devices traversing a specific Integrated Resource automatically detects and establishes the necessary service allocation, be it for voice-over-IP, video-over-IP, or any other form of digital communication.

A Facility need not be a single physical structure such as a building or parking structure, and a collection of Facilities, such as a campus, may not be a single contiguous physical area.

Resource Routing and Switching Services

The Integrated Resource provides a system of routing and switching services that reduce or even eliminate backhaul communication services. These routing and switching services include the following.

Routing Local Service Requests to the Integrated Resource Data Center

By integrating routing and data center functions, the Integrated Resource allows carriers providing network connectivity to add a range of proximate services located close to the devices requesting those services. Such services may include subscriber authentication and other processes such as are managed in cellular networks by the Evolved Packet Core, access to virtual machines, database resources, content delivery, user content storage, failover, backup services, and network analytics.

The Integrated Resource provides this service by connecting a router with access to a local destination logic of available proximate services populated by the carrier and/or by the clients in a facility served by the Integrated Resource. Communications received at the Integrated Resource are inspected for proximate services, and if such proximate services are available, the packets are routed to the data center function for servicing. With the advent of virtual machines, carriers through the use of the Integrated Resource are enabled to provide services with proximate data center services equivalent to those same services offered through WAN backhaul and backbone infrastructure to remote data centers.

Routing Local Communications to Local Devices within a Facility Served by the Integrated Resource By maintaining a registration table of all locally connected devices, the enhanced routing function of the Integrated Resource can redirect communications within a Facility or among Facilities within a campus without involving WAN backhaul infrastructure. With the growth of devices not requiring direct user operation, such as sensors and cameras, the Integrated Resource can manage substantial local data loads without placing new burdens on WAN backhaul infrastructure.

Routing Local Communications to Devices Locally Served by a Second Integrated Resource Connected to another Integrated Resource The enhanced routing function of the Integrated Resource supports local routing logic for communications services available at one or more connected Integrated Resources. By redirecting WAN-bound traffic to an off-WAN connected Integrated Resource, the Integrated Resource avoids the use of WAN backhaul infrastructure. Instead, such network traffic remains off the WAN and only access it when the Integrated Resource programmatically determines the WAN is the preferred path. Such routing for Integrated Resources located within, by today's capacities, 1000 kilometers circumference (ring network architecture) of each other may use wavelength routing within an optical package switch and transport (OPST). By assigning specific wavelengths to ports connected to the OPST, an Integrated Resource controlling a tunable transmitter may route communications around a fiber optic ring, where each port receives its assigned wavelength.

Time-shifting Requests for Backhaul Services, such as Moving Content in Anticipation of Proximate Requests With its integrated data center function, an Integrated Resource can provide content storage and retrieval for both user- and vendor-supplied content. A user can schedule future access to content (such as establishing a virtual machine with resources available in a travel destination) rather than requiring just-in-time service request fulfillment dependent on WAN backhaul and backbone network resources. A content vendor, such as a media distribution company, can position popular content in anticipation of local demand thereby limiting WAN backhaul transfer of large media files to off-peak transfer to selected Integrated Resources rather than serving each user request over the network as it is received.

Switching RF Carrier used for Backhaul Services, such as Switching from Cellular to WiFi A given service provider may have multiple WAN backhaul infrastructures, such as LTE, Ethernet, cable communications, and 802.11x. The enhanced routing capability of the Integrated Resource, enabled by its multimodal communications architecture and data center capabilities, allows a vendor of services to operate a gateway among such infrastructures to shift communication traffic that requires WAN backhaul infrastructure to move by means of the best available infrastructure.

This offload switching, such as from RF to WiFi, also applies to incoming communications from the RF carrier's data centers, the Internet or any other data center that the RF carrier may choose to enable, such as Google, Facebook, Bing, Yahoo, and other such services that take advantage, following net neutrality, of the carrier's RF communication infrastructure to that wireless device. The Integrated Resource can, following carrier and/or user settings, switch incoming communications into a preferred channel for management of latency, security, or other such preference.

Switching Vendor Infrastructure for WAN Backhaul Services, Placing Communications into Destination Carrier Infrastructure, if available By permitting collocation of multiple RF carrier vendors in a single Integrated Resource, switching of packets onto the WAN backhaul infrastructure of any one of them, based on real-time assessment of lowest latency on any of their respective infrastructures, is enabled.

Example of an Integrated Resource Configuration

An Integrated Resource in an isolated, off-WAN form may be configured for entirely local services and routing, providing a local RF carrier, operating without access to an external wide area network such as the Internet. Such an implementation might be used in managing continuous feed sensor networks in a particular area under surveillance, or for secure corporate communications among a number of proximate buildings. The following components can be distinguished:

1. Any type of device capable of communicating wirelessly (such as by means of RF or WiFi).
2. Bi-directionally communicating with any form of antenna (femtocell, picocell, small cell, or any other type of antenna) between components 1 and 3.
3. An antenna for converting upload signals from electrical to optical (E-O) or download signal from Optical to electrical (O-E).
4. An antenna for connecting with optical fiber or free space optical transceiver (FSOT).
5. An optical fiber for connecting with headend unit (HEU) either directly or via any form of amplifier or other signal conditioning opto-electronics in the path from an antenna to the HEU.
6. An HEU for directing RF or any other signal type to a carrier, service provider signal source & signal processing opto-electronics that, in the invention, reside proximately within an Integrated Resource.
7. Signal source & signal processing opto-electronics for converting uploaded signal, if not already digital, into a digital format such as Ethernet frames as well as converting, for instance Ethernet frames to RF for transmission via HEU to the antenna for download to the communicating device.
8. Once converted to digital format the uploaded signal is inspected, interpreted, and a variety of services, for instance, in an LTE implementation of the invention, such services would include a Mobility Management Entity (MME), a Home Subscriber Server (HSS), a Serving Gateway (SGW), a Packet Data Network Gateway (PDNG), etc.
9. Simultaneously or serially, as services indicated in component 8 are being performed, the digital frames/packets flow to and are processed by one or more routers within the Resource.
10. Routing is then either to an Integrated Resource for computational processing, database analysis, digital storage, provisioning of virtual machines, or any other application.
11. Or routing is to any network (public or private) to which the Integrated Resource is connected. Such networks could be that of a telecommunication carrier, the Internet or other public networks, or to other Integrated Resources.
12. Similar routing can be done on digitally formatted signals received by the Integrated Resource from any network that it has access to as to either store, compute and store, otherwise to service as well as to transmit to a user device being served by the Integrated Resource. Any form of antenna capable of transmitting and receiving any frequency as either an analog or digital signal is anticipated as potential ways to implement the invention.

Connections throughout the entire implementation can be purely copper (i.e., electrical), purely fiber (i.e. optical/photonic) or a hybrid of copper and fiber. Connections may also be wireless.

Any form factor of copper cable (e.g., coaxial cable), or fiber (e.g., single mode), or hybrid combination of form factors is anticipated as potential ways to implement the invention.

In one embodiment, the inventive system described here may be implemented by the following equipment list:

Corning ONE Wireless Antenna unit comprised of both a radio antenna (e.g., femtocell), a WiFi access point (802.11n, ac, ad, whatever), one or more Ethernet ports powered by PowerOverEthernet, aka PoE) connected to a per floor interconnect unit, connected to an aggregating fiber management unit, connected to an optical interface unit, connected to a headend unit (with RF & digital line cards) connected to any device capable of providing full eNodeB functionality connected to any device capable of providing Evolved Packet Core functionality connected to a router that is connected to both an Integrated Resource Primary Router (or switch) and to either fiber or some other mechanism (i.e., free space optics microwave transceiver) enabling wide area network/Internet connectivity as well as internal to the Integrated Resource connectivity to any form of computer and storage system.

Flow Control Logic

The following example is of a flow control logic algorithm to shutdown backhaul and redundant data communications. It is noted that any number of methods might be used other than router dynamically updated lookup tables—algorithms, firmware, hardwired circuits, or combinations. The key point is that traffic separates into status/non-local and local, and local stays local, but behaves (other than its service path and latency) as if it has also traversed a wide area network.

Cellular

A remote device (User Equipment (UE in LTE terminology)) within the service area of a DAS generates a signal that passes through the DAS to a line card operating at the RF of the UE. The DAS line card is connected to an eNodeB. The eNodeB converts the signal to Ethernet packets and passes the packets sequentially to the Integrated Resource Primary Router (IRPR).

The IRPR inspects each packet header, checks the packet header for EPC mark-up against local destination logic LDT.

If no EPC markup, then IRPR sends packet to EPC.

If EPC markup, then the IRPR routes according to that markup.

If the markup matches an integrated eNodeB destination, then IRPR routes to that eNodeB.

If the markup does not match an integrated eNodeB destination, then IRPR checks the packet for status.

If status, then if WAN, IRPR routes to WAN,

Else if status, and not WAN, then IRPR routes to EPC,

Else if not status, then IRPR checks LDT.

If LDT, then IRPR routes to the IR,

Else if IRTx, IRPR checks the IRx LDTs.

If match, then IRPR routes to the specified IRPRTx,

Else IRPR checks for custom WAN routing logic IRCT.
If a IRCT, then
If match, IRPR routes onto the custom WAN,
Else IRPR routes onto the WAN, if available
If bad packet header, then IRPR routes to EPC for management.
General Communication Protocol, Non-cellular
The IRPR inspects each signal, checks the signal for markup by installed control function XC.
If no XC markup, then IRPR sends packet to XC.
If XC markup, then the IRPR routes according to that markup.
If the markup matches a destination available locally using X protocol and the IRPR LDT, then IRPR routes to that local destination using the local X communication resource.
If the markup does not match a destination available locally, then IRPR checks the packet for status.
If status, then if X protocol WAN available, IRPR routes to X protocol WAN,
Else if status, and not WAN, then IRPR routes to XC,
Else if not status, then IRPR checks LDT.
If LDL, then IRPR routes to the IRSR,
Else if IRPRTx, IRPR checks the IRPRx LDLs.
If match, then IRPR routes to the specified IRPRTx via protocol X,
Else IRPR checks for custom X protocol WAN routing logic IRCT.
If a custom X protocol WAN Table, then
If match, IRPR routes onto the custom X protocol WAN,
Else IRPR routes onto the X protocol WAN, if available.
If IRPR cannot otherwise route signal, then IRPR routes signal to XC for management.
For Local Routing at IRSR
IRSR receives packet from the IRPR
IRSR checks for local address in IRSR Table IRSRT
If match, then IRSR routes to IRDC,
Else if IRNTx, then IRSR checks the data center routing logic IRNTx of connected IRSRx.
If match, then IRSR routes to designated IRSRx,
Else IRSR routes to WAN,
Else ISRR routes back to IRPR as error, updates IRPR LDT
IRSR receives packet from Ethernet source (WFR or EN direct connection)
IRSR checks for registered device in IRRDT.
If not in registered device logic IRRDT then IRSR routes to data center mN escrow and sets error flag for handling,
Else if in IRRDT,
then IRSR checks for local address in IRNT,
If match, then IRSR routes to data center mN,
Else if IRNTx, then IRSR checks the data center logic IRNTx of connected IRSRx
If match, then IRSR routes to designated IRSRx,
Else IRSR routes to IRPR if IRPR available
For any connection between IRPR and IRSR, or IRPR and IRPRTx, or IRSR and IRSRx, if a direct connection is not available, then the sending device may attempt a WAN connection to the designated device.

What is claimed is:

1. A system for local data communication traffic management, comprising:
    (a) an off-WAN eNodeB communicatively connected to a proximate transceiver capable of conveying communications to and from the eNodeB;
    (b) an off-WAN Evolved Packet Core (EPC); and
    (c) a router operable in an off-WAN mode and communicatively connected to the eNodeB and the EPC, and wherein the router is an intermediary between the eNodeB and the EPC,
    wherein the router is configured at the output of the eNodeB to selectively determine which data packets stay off-WAN, and
    wherein the EPC serves the data packets from the eNodeB via the router in an off-WAN mode,
    wherein within the system a transmission pathway is less than 30 meters.

2. The system as set forth in claim 1, wherein there is no bidirectional amplifier communicatively connected between the eNodeB and the proximate transceiver.

3. The system as set forth in claim 1, wherein within the system delays of packets in the communications are less than 150 milliseconds.

4. The system as set forth in claim 1, further comprising an off-WAN data center communicatively connected to the router, wherein the data center hosts compute and data storage services.

5. The system as set forth in claim 1, wherein data packets directed to a WAN are routed by the router to stay off-WAN.

6. The system as set forth in claim 5, wherein the router selectively sends some of the data packets to the WAN.

7. The system as set forth in claim 1, wherein the system is a mobile system.

8. The system as set forth in claim 1, wherein the system is integrated within a mobile device.

9. A method for local data communication traffic management, comprising:
    (a) receiving data packets from one or more signal distribution, transceiver systems or a distributed antenna system, wherein the data packets are received by an off-WAN operable eNodeB;
    (b) configuring an off-WAN operable router at the output of the eNodeB, wherein the router ensures that the data packets stay off-WAN; and
    (c) serving the received data packets off-WAN via the router by an off-WAN operable Evolved Packet Core (EPC),
    wherein a transmission pathway for the local data communication is less than 30 meters, or wherein delays of packets in the communications are less than 150 milliseconds.

10. The method as set forth in claim 9, further comprising an off-WAN data center communicatively connected to the router, wherein the data center hosts compute and data storage services.

11. The method as set forth in claim 9, wherein data packets directed to a WAN are routed by the router to stay off-WAN.

12. The method as set forth in claim 11, wherein the router selectively sends some of the data packets to the WAN.

13. The method as set forth in claim 9, wherein the method is a mobile solution.

14. The method as set forth in claim 9, wherein the method is integrated within a mobile device.

* * * * *